United States Patent
Yang

(10) Patent No.: US 9,461,686 B2
(45) Date of Patent: Oct. 4, 2016

(54) MOBILE COMMUNICATION DEVICE

(71) Applicant: Acer Incorporated, New Taipei (TW)

(72) Inventor: Chung-Wen Yang, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 14/571,309

(22) Filed: Dec. 16, 2014

(65) Prior Publication Data

US 2015/0171911 A1    Jun. 18, 2015

(30) Foreign Application Priority Data

Dec. 18, 2013   (TW) .............................. 102146904 A

(51) Int. Cl.
*H04B 1/18* (2006.01)
*H04B 1/3827* (2015.01)

(52) U.S. Cl.
CPC .................... *H04B 1/3838* (2013.01)

(58) Field of Classification Search
CPC ..................................................... H04B 1/3838
USPC .......... 455/78, 280, 550.1; 343/720
See application file for complete search history.

(56) References Cited

U.S. PATENT DOCUMENTS

| | | | | |
|---|---|---|---|---|
| 2011/0175789 A1* | 7/2011 | Lee | ......................... | H01Q 1/243 343/853 |
| 2013/0127677 A1* | 5/2013 | Lin | ......................... | H01Q 5/328 343/722 |
| 2013/0335258 A1* | 12/2013 | Chung | ................ | H04B 1/3838 342/27 |

* cited by examiner

*Primary Examiner* — Hsin-Chun Liao
(74) *Attorney, Agent, or Firm* — Jianq Chyun IP Office

(57) ABSTRACT

A mobile communication device including an antenna element, a low-frequency blocking element, a first isolation circuit, a second isolation circuit and a high-frequency blocking element is provided. The antenna element converts a radio-frequency signal into an electromagnetic wave and generates a sensing signal in response to a proximity of an object. The antenna element includes a radiation portion and a parasitic portion which are spaced by a coupling gap. The low-frequency blocking element transmits the radio-frequency signal to the radiation portion. The first isolation circuit and a connection element are connected in series between the radiation portion and the parasitic portion, and the first isolation circuit blocks the radio-frequency signal. The second isolation circuit is electrically connected between the parasitic portion and a ground plane, and blocks the sensing signal. The high-frequency blocking element transmits the sensing signal from the antenna element to a sensing controller through a metal line.

7 Claims, 3 Drawing Sheets

MOBILE COMMUNICATION DEVICE

CROSS-REFERENCE TO RELATED APPLICATION

This application claims the priority benefit of Taiwan application serial no. 102146904, filed on Dec. 18, 2013. The entirety of the above-mentioned patent application is hereby incorporated by reference herein and made a part of this specification.

BACKGROUND OF THE INVENTION

1. Field of the Invention

The invention relates to a mobile communication device, and more particularly, relates to a mobile communication device capable of sensing by using an antenna element.

2. Description of Related Art

A proximity sensor is disposed in most of the existing mobile communication devices in order to prevent an electromagnetic wave radiated by an antenna element from endangering human health. Generally, the proximity sensor includes a sensing electrode and a sensing controller. Further, the sensing electrode is often placed next to the antenna element in the existing mobile communication devices, so as to satisfy demands of miniaturization for the mobile communication devices. Further, when the human body is near the antenna element, the sensing controller may output a control signal for reducing an output power of a radio-frequency module, so as to reduce absorption of the electromagnetic wave by the human body.

However, a radiation characteristic of the antenna element is usually influenced when a larger area of the sensing electrode is placed next to the antenna element, such that a communication quality of mobile communication device is reduced accordingly.

SUMMARY OF THE INVENTION

The invention is directed to a mobile communication device, which combines an antenna element and a sensing electrode as one by using an isolation circuit and a blocking element. Accordingly, the antenna element includes the function of the sensing electrode and reduces influences caused by the sensing electrode to the antenna element.

A mobile communication device of the invention includes an antenna element, a low-frequency blocking element, a first isolation circuit, a second isolation circuit and a high-frequency blocking element. The antenna element is provided with a capacitive sensing function and an antenna function, and the naming of the low-frequency blocking element and the high-frequency blocking element is defined for better understanding of their functions. For example, a behavior of a capacitance change in the capacitive sensing is of low-frequency as compared to the antenna function, and a behavior of a resonant current distribution in the antenna function is of high-frequency as compared to the capacitance sensing. The low-frequency and high-frequency blocking elements allow the antenna element to include both functions without having them influencing each other. In addition, the antenna element is equivalent to a capacitance sensing element. For example, the antenna element may be regarded as a larger sheet of metal plate, and a capacitance of the antenna element changes when an object is near to thereby generate a sensing signal. In addition, the antenna element includes a radiation portion and a parasitic portion which are spaced by a coupling gap. The low-frequency blocking element is electrically connected to the radiation portion, and configured to block the sensing signal from flowing into a feeding point of the radiation portion. In application, the feeding point of the radiation portion is electrically connected to a radio-frequency module through a coaxial cable, such path generates a large capacitance, and the antenna element cannot sense a proximity of the object if the sensing signal is not blocked by using the low-frequency blocking element. In addition, the low-frequency blocking element does not block the radio-frequency signal, so that the radio-frequency signal can still be transmitted to the feeding point of the radiation portion. The first isolation circuit and a connection element are connected in series between the radiation portion and the parasitic portion, and the first isolation circuit is configured to block the radio-frequency signal and allow the sensing the sensing signal to pass through. The second isolation circuit is electrically connected between the parasitic portion and a ground plane, and the second isolation circuit is configured to block the sensing signal from passing through and transmit the radio-frequency signal. The high-frequency blocking element is electrically connected between the parasitic portion and a metal line to block the radio-frequency signal from flowing into a sensing controller and transmit the sensing signal from the antenna element to the sensing controller through the metal line.

In another embodiment, a mobile communication device of the invention includes an antenna element, a low-frequency blocking element, an isolation circuit, a first high-frequency blocking element and a second high-frequency blocking element. The antenna element includes a radiation portion and a parasitic portion which are spaced by a coupling gap. The parasitic portion generates a first sensing signal in response to a proximity of an object, and the radiation portion generates a second sensing signal in response to the proximity of the object. The low-frequency blocking element is electrically connected to the radiation portion, and configured to block the sensing signal from flowing into a feeding point. In application, the feeding point is electrically connected to a radio-frequency module through a coaxial cable. Such path generates a large capacitance, and the antenna element cannot sense a proximity of the object if the sensing signal is not blocked by using the low-frequency blocking element. In addition, the low-frequency blocking element does not block the radio-frequency signal, so that the radio-frequency signal can still be transmitted to the feeding point of the radiation portion. The isolation circuit is electrically connected between the parasitic portion and a ground plane. In addition, the isolation circuit is configured to block the first sensing signal and transmit the radio-frequency signal. The first high-frequency blocking element is electrically connected between the parasitic portion and a first metal line, and transmits the first sensing signal to a first sensing controller through the first metal line. The second high-frequency blocking element is electrically connected between the radiation portion and a second metal line, and transmits the second sensing signal to a second sensing controller through the second metal line.

Based on the above, in addition to the function of the wireless transmission, the antenna element of the invention may also be used as the sensing element of the sensing controller. In addition, the high-frequency blocking element is further disposed on the parasitic portion of the antenna element in the invention, such that the metal line for connecting to the sensing controller may be routed from at least one side of the antenna element. Accordingly, the radio-frequency signal may be blocked from flowing into the sensing controller through the metal line, so as to prevent original characteristics of the antenna element from being influenced.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
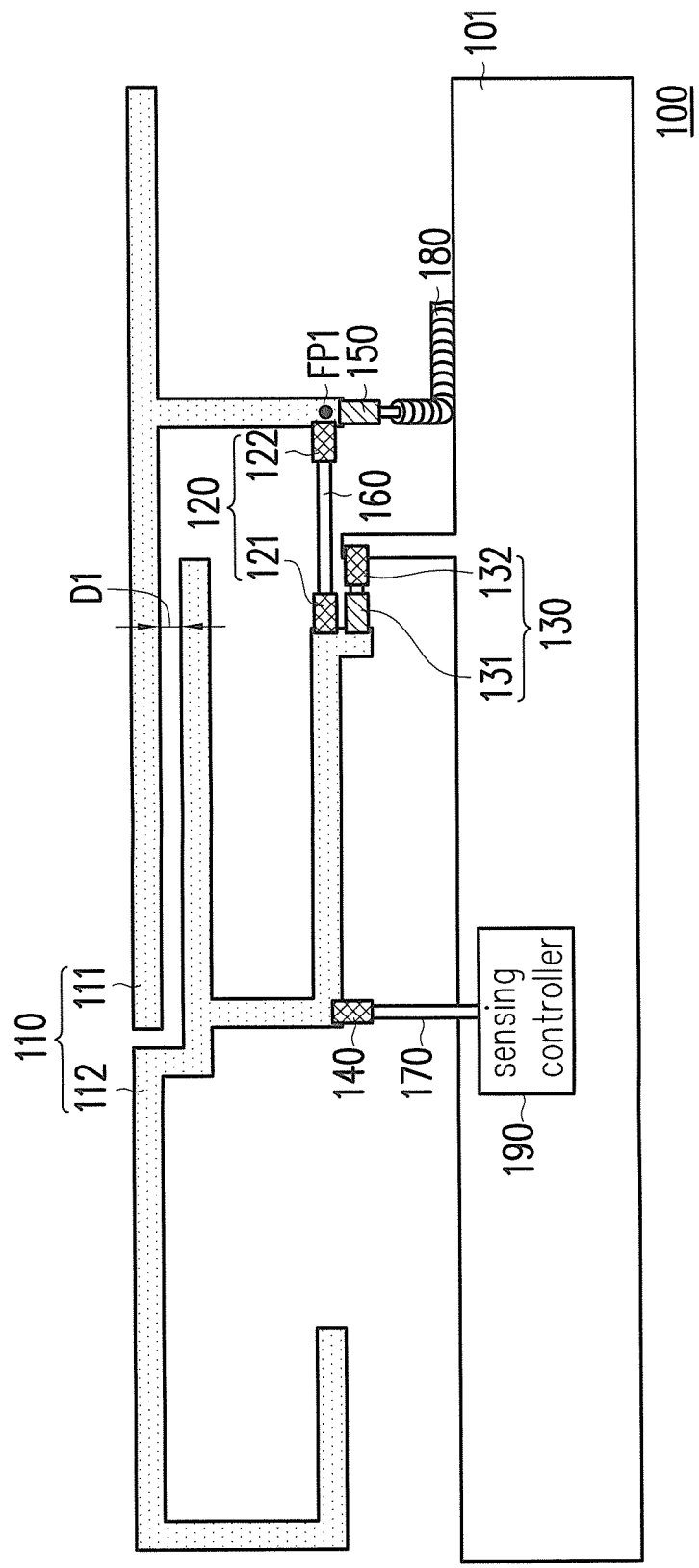
FIG. 1 is a schematic structural view illustrating a mobile communication device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic structural view illustrating a mobile communication device according to an embodiment of the invention. As shown in FIG. 1, a mobile communication device 100 includes an antenna element 110, a first isolation circuit 120, a second isolation circuit 130, a high-frequency blocking element 140 and a low-frequency blocking element 150. The antenna element 110 includes a radiation portion 111 and a parasitic portion 112.

The radiation portion 111 has a feeding point FP1, and the radiation portion 111 and the parasitic portion 112 are spaced by a coupling gap D1. Further, the first isolation circuit 120 and a connection element 160 are connected in series between the radiation portion 111 and the parasitic portion 112. The second isolation circuit 130 is electrically connected between the parasitic portion 112 and a ground plane 101. The high-frequency blocking element 140 is electrically connected between the parasitic portion 112 and a metal line 170. The low-frequency blocking element 150 is electrically connected to the radiation portion 111.

In operation, the antenna element 110 may convert a radio-frequency signal into an electromagnetic wave, so that the mobile communication device 100 may perform a wireless transmission through the antenna element 110. For instance, in an embodiment, the radiation portion 111 is electrically connected to a coaxial cable 180 through the low-frequency blocking element 150. The coaxial cable 180 is configured to transmit the radio-frequency signal generated by a radio-frequency module in the mobile communication device 100. Further, the radio-frequency signal transmitted by the coaxial cable 180 passes through the low-frequency blocking element 150 to be transmitted to the feeding point FP1 of the radiation portion 111, and the antenna element converts the radio-frequency signal into the electromagnetic wave to be transmitted.

It should be noted that, for the radio-frequency signal (e.g., an antenna current), the first isolation circuit 120 and the high-frequency blocking element 140 form a broken circuit (i.e., open circuit) for blocking the radio-frequency signal (e.g., the antenna current) from passing through, and the second isolation circuit 130 forms a short circuit for allowing the radio-frequency signal (e.g., the antenna current) to pass through. Accordingly, the radiation portion 111 generates at least one high-frequency resonant mode under excitation of the radio-frequency signal. For example, in the embodiment of FIG. 1, a shape of the radiation portion 111 is a T-shape, and the radiation portion 111 is essentially a dual-band monopole antenna. Therefore, the antenna element 110 may generate two high-frequency resonant modes through the radiation portion 111.

In addition, the radio-frequency signal (e.g., the antenna current) from the radiation portion 111 is coupled to the parasitic portion 112 and conducted to the ground plane 101 through the second isolation circuit 130, such that the antenna element 110 may also generate at least one low-frequency resonant mode through the radiation portion 111 and the parasitic portion 112. For example, in the embodiment of FIG. 1, the radiation portion 111 and the parasitic portion 112 may form a first low-frequency resonance path, and the parasitic portion 112 itself may from a second low-frequency resonance path. Therefore, the antenna element 110 may generate two low-frequency resonant modes through the radiation portion 111 and the parasitic portion 112. Accordingly, the antenna element 110 may convert the radio-frequency signal into the electromagnetic wave, so as to accomplish a characteristic of multi-frequency operation.

In addition, the mobile communication device 100 may further utilize the antenna element 110 to sense whether an object (e.g., the human body) exists nearby, and adjust a radiation power of the antenna element 110 according to a sensing result. For example, the antenna element 110 is equivalent to one sensing electrode in which an initial capacitance changes when the human body is near. The sensing controller 190 detects changes in a capacitance. Further, when the human body is close to a specific distance, the sensing controller 190 detects a capacitance exceeding a set value and thereby generates a signal to the radio-frequency module for reducing an output power of the radio-frequency module. The first isolation circuit 120 and the high-frequency blocking element 140 transmit a sensing signal, and the second isolation circuit 130 and the low-frequency blocking element 150 block the sensing signal. In other words, for the sensing signal, the first isolation circuit 120 and the high-frequency blocking element 140 form a short circuit for transmitting the sensing signal, and the second isolation circuit 130 and the low-frequency blocking element 150 form a broken circuit (i.e., open circuit) for blocking the sensing signal from passing through.

Therefore, the radiation portion 111 and the parasitic portion 112 in the antenna element 110 may be regarded as a large sheet of metal plate to be further used as a sensing element (e.g., the sensing electrode) of the sensing controller 190. The low-frequency blocking element 150 may be used to prevent a sensing function of the antenna element 110 from being influenced by the coaxial cable 180. Furthermore, the high-frequency blocking element 140 may transmit the sensing signal from the antenna element 110 to the sensing controller 190 through the metal line 170, and the sensing controller 190 may determine whether an object exists near the mobile communication device 100 according to the sensing signal. Accordingly, the mobile communication device 100 may adjust a transmit power of the radio-frequency module according to a determination result of the sensing controller 190, so as to prevent the electromagnetic wave radiated by the antenna element 110 from endangering human health.

In other words, besides that the antenna element 110 includes the function of the wireless transmission, the antenna element 110 may also be used as the sensing element of the sensing controller 190. It should be noted, in the present embodiment, the high-frequency blocking element 140 is disposed on the parasitic portion 112 of the antenna element 110, such that a transmission path for connecting to the sensing controller 190 is extended from the parasitic portion 112 of the antenna element 110. Accordingly, the present embodiment is capable of routing the metal line 170 for connecting to the sensing controller 190 from one side of the antenna element 110. Therefore, the present embodiment is capable of reducing a length of the metal line 170 for connecting to the sensing controller 190, or preventing the metal line 170 from being too close to the antenna element 110, so as to reduce influences caused by the metal line 170 to the antenna element 110.

It is worth mentioning that, the low-frequency blocking element 150 may be, for example, a capacitive element. A first terminal of said capacitive element is adjacent to the feeding point FP1 and electrically connected to the radiation portion 111, a second terminal of said capacitive element is electrically connected to an inner conductor of the coaxial cable 180, and a capacitance of said capacitive element may be, for example, 15 pF. Further, the high-frequency blocking element 140 may be, for example, an inductive element, an inductance of said inductive element is greater than 120 nH, and the inductance may be adjusted according to actual situations.

Furthermore, the first isolation circuit 120 includes an inductive element 121 and an inductive element 122. A first terminal of the inductive element 121 is electrically to the parasitic portion 112, and a second terminal of the inductive element 121 is electrically connected to the connection element 160. Further, a first terminal of the inductive element 122 is electrically connected to the connection element 160, and a second terminal of the inductive element 122 is electrically connected to the radiation portion 111. Accordingly, the first isolation circuit 120 may block the radio-frequency signal (e.g., the antenna current) and transmit the sensing signal through the inductive elements 121 and 122.

Although FIG. 1 illustrates an implementation pattern of the first isolation circuit 120, the invention is not limited thereto. For instance, in another embodiment, the first isolation circuit 120 may only include one of the inductive elements 121 and 122, and the included inductive element 121 (or 122) may also be connected in series with the connection element 160. That is, in another embodiment, the first isolation circuit 120 includes an inductive element, and said inductive element and the connection element 160 are connected in series between the radiation portion 111 and the parasitic portion 112.

Furthermore, the second isolation circuit 130 includes a capacitive element 131 and an inductive element 132. A first terminal of the capacitive element 131 is electrically connected to the parasitic portion 112. In addition, a first terminal of the inductive element 132 is electrically connected a second terminal of the capacitive element 131, and a second terminal of the inductive element 132 is electrically connected to the ground plane 101. Accordingly, the second isolation circuit 130 may block the sensing signal and transmit the radio-frequency signal through the capacitive element 131 and the inductive element 132.

Figure 2:
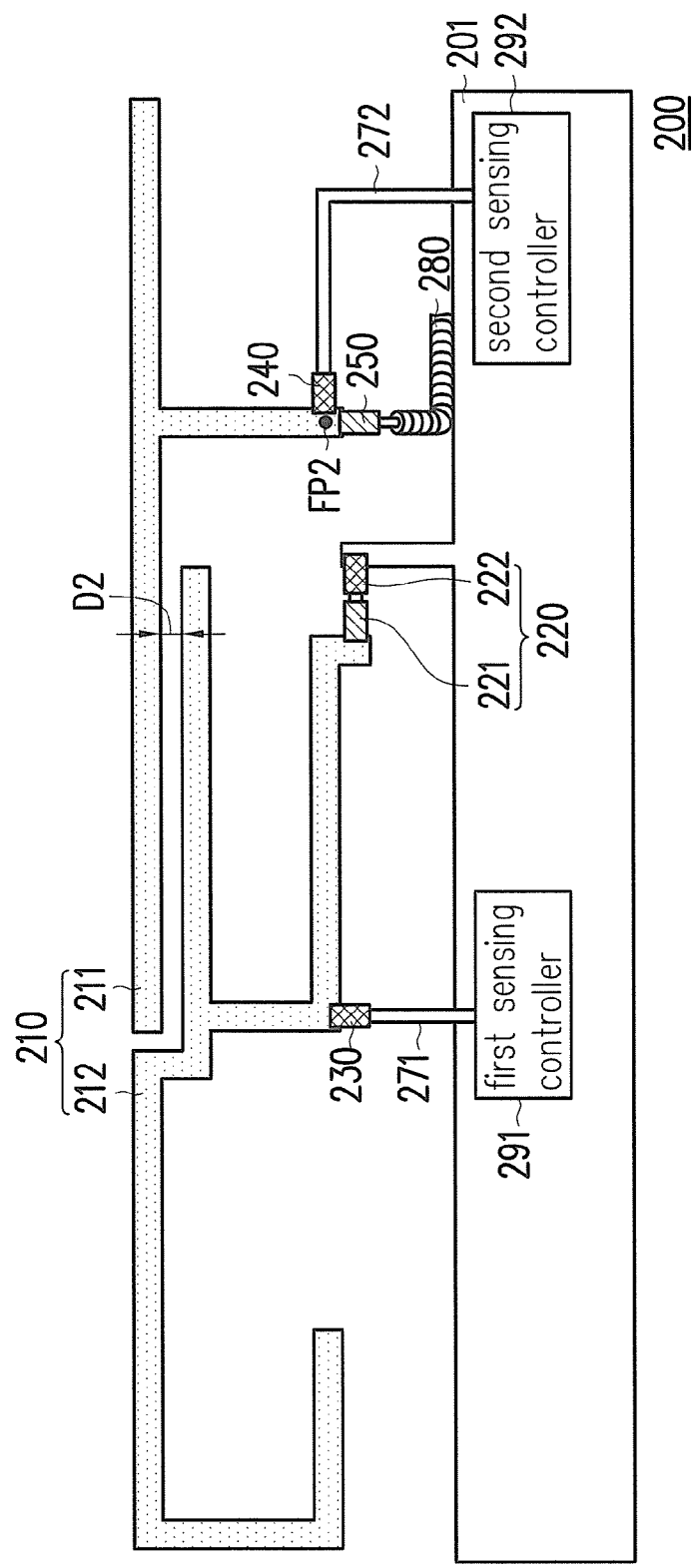
FIG. 2 is a schematic structural view illustrating a mobile communication device according to another embodiment of the invention.

FIG. 2 is a schematic structural view illustrating a mobile communication device according to another embodiment of the invention. As shown in FIG. 2, a mobile communication device 200 includes an antenna element 210, an isolation circuit 220, a first high-frequency blocking element 230, a second high-frequency blocking element 240 and a low-frequency blocking element 250. The antenna element 210 includes a radiation portion 211 and a parasitic portion 212.

The radiation portion 211 has a feeding point FP2, and the radiation portion 211 and the parasitic portion 212 are spaced by a coupling gap D2. In addition, the isolation circuit 220 is electrically connected between the parasitic portion 212 and a ground plane 201. The first high-frequency blocking element 230 is electrically connected between the parasitic portion 212 and a first metal line 271. The second high-frequency blocking element 240 is electrically connected between the radiation portion 211 and a second metal line 272. The low-frequency blocking element 250 is electrically connected to the radiation portion 211.

In operation, the antenna element 210 may convert a radio-frequency signal into an electromagnetic wave, so that the mobile communication device 200 may perform a wireless transmission through the antenna element 210. For instance, in an embodiment, the radiation portion 211 is electrically connected to a coaxial cable 280 through the low-frequency blocking element 250. The coaxial cable 280 is configured to transmit the radio-frequency signal generated by a radio-frequency module. In addition, the low-frequency blocking element 250 receives the radio-frequency signal from the coaxial cable 280, and transmits the radio-frequency signal to the feeding point FP2 of the radiation portion 211. Furthermore, the radio-frequency signal of the radiation portion 211 is coupled to the parasitic portion 212 by the coupling gap D2.

It should be noted that, for the radio-frequency signal, the isolation circuit 220 forms a short circuit for transmitting the radio-frequency signal, and the first high-frequency blocking element 230 and the second high-frequency blocking element 240 form a broken circuit (i.e., open circuit) for blocking the radio-frequency signal from passing through. Accordingly, as similar to the embodiment of FIG. 1, the radiation portion 211 generates at least one high-frequency resonant mode under excitation of the radio-frequency signal. In addition, the radio-frequency signal from the radiation portion 211 is coupled to the parasitic portion 212, such that the antenna element 210 may also generate at least one low-frequency resonant mode through the radiation portion 211 and the parasitic portion 212. Accordingly, the antenna element 210 may convert the radio-frequency signal into the electromagnetic wave, so as to accomplish a characteristic of multi-frequency operation.

In addition, the mobile communication device 200 may further utilize the antenna element 210 to sense whether an object exists nearby, and adjust a radiation power of the antenna element 210 according to a sensing result. For example, the parasitic portion 212 generates a first sensing signal in response to a proximity of an object. On the other hand, the radiation portion 211 also generates a second sensing signal in response to the proximity of the object. For the first sensing signal, the isolation circuit 220 forms a broken circuit (i.e., open circuit) for blocking the first sensing signal from passing through. In addition, the first high-frequency blocking element 230 forms a short circuit and transmits the first sensing signal to a first sensing controller 291 through the first metal line 271. On the other hand, for the second sensing signal, the second high-frequency blocking element 240 forms a short circuit and transmits the second sensing signal to a second sensing controller 292 through the second metal line 272.

In other words, the parasitic portion 212 is equivalent to a sensing element of the first sensing controller 291, and the radiation portion 211 is equivalent to a sensing element of the second sensing controller 292. The low-frequency blocking element 250 may be used to prevent a sensing function of the radiation portion 211 from being influenced by the coaxial cable 280. On the other hand, the first sensing controller 291 and the second sensing controller 292 may determine whether an object exists near the mobile communication device 200 according to sensing results of the parasitic portion 212 and the radiation portion 211. In addition, the mobile communication device 200 adjusts a transmit power of the antenna element 210 according to determination results of the first sensing controller 291 and the second sensing controller 292, so as to prevent the electromagnetic wave radiated by the antenna element 210 from endangering human health.

Specifically, besides that the antenna element 210 includes the function of the wireless transmission, the antenna element 210 may also be used as the sensing elements of the two sensing controllers 291 and 292. It should be noted, in the present embodiment, transmission paths for connecting to the two sensing controllers 291 and 292 are extended from the radiation portion 211 and the parasitic portion 212, respectively. Accordingly, the present embodiment is capable of routing the two metal lines 271 and 272 for connecting to the two sensing controllers 291 and 292 respectively from two sides of the antenna element 210. Therefore, the present embodiment is capable of reducing lengths of the two metal lines 271 and 272, or preventing the two metal lines 271 and 272 from being too close to the antenna element 210, so as to reduce influences caused by the two metal lines 271 and 272 to the antenna element 210.

Furthermore, the isolation circuit 220 includes a capacitive element 221 and an inductive element 222. A first terminal of the capacitive element 221 is electrically connected to the parasitic portion 212. In addition, a first terminal of the inductive element 222 is electrically connected a second terminal of the capacitive element 221, and a second terminal of the inductive element 222 is electrically connected to the ground plane 201. Accordingly, the isolation circuit 220 may block the first sensing signal and transmit the radio-frequency signal through the capacitive element 221 and the inductive element 222.

Figure 3:
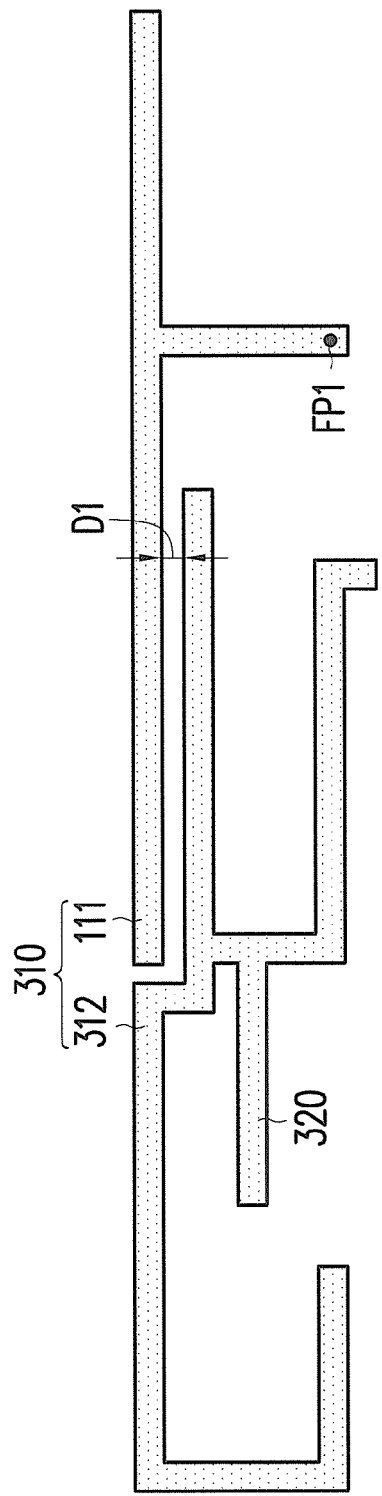
FIG. 3 and FIG. 4 are schematic structural views respectively illustrating an antenna element according to an embodiment of the invention.
Figure 4:
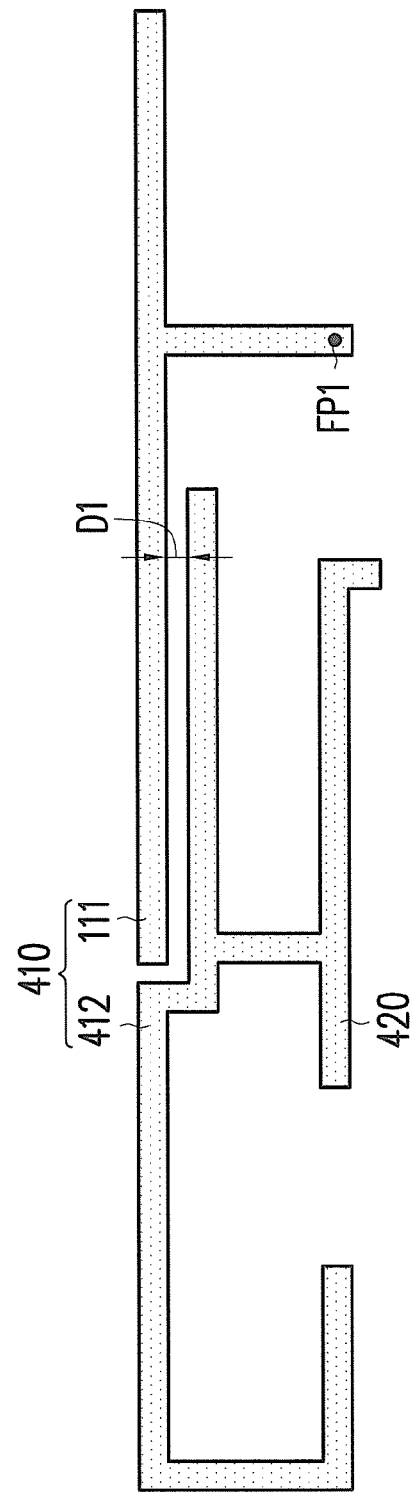

It is worth mentioning that, although the foregoing embodiment illustrates an implementation pattern of the radiation element, the invention is not limited thereto. Persons of ordinary skill in the art may dispose an extending segment in the antenna element based on design requirements, so as to increase operation bands of the antenna element. For instance, FIG. 3 and FIG. 4 are schematic structural views respectively illustrating an antenna element according to an embodiment of the invention In comparison with the antenna element 110 of FIG. 1, a parasitic portion 312 in an antenna element 310 of FIG. 3 further includes an extending segment 320, and a parasitic portion 412 in an antenna element 410 of FIG. 4 further includes an extending segment 420. Accordingly, the parasitic portion 312 may also utilize the extending segment 320 to generate a high-frequency resonance path, so as facilitate in expanding the operation bands for the antenna element 310. Similarly, the antenna element 410 may also expand the operation bands thereof through the extending segment 420.

In summary, in addition to the function of the wireless transmission, the antenna element of the invention may also be used as the sensing element of the sensing controller. In addition, the high-frequency blocking element is further disposed on the parasitic portion of the antenna element in the invention, such that the metal line for connecting to the sensing controller may be routed from at least one side of the antenna element. Accordingly, the length of the metal line for connecting to the sensing controller may be reduced, or the metal line may be prevented from being too close to the antenna element, so as to reduce influences caused by the metal line to the antenna element.

Although the present disclosure has been described with reference to the above embodiments, it will be apparent to one of ordinary skill in the art that modifications to the described embodiments may be made without departing from the spirit of the present disclosure. Accordingly, the scope of the present disclosure will be defined by the attached claims and not by the above detailed descriptions.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A mobile communication device, comprising:
   an antenna element, converting a radio-frequency signal into an electromagnetic wave and generating a sensing signal in response to a proximity of an object, and the antenna element comprising a radiation portion and a parasitic portion which are spaced by a coupling gap;
   a low-frequency blocking element, electrically connected to the radiation portion, and the low-frequency blocking element receiving the radio-frequency signal and transmitting the radio-frequency signal to a feeding point of the radiation portion;
   a first isolation circuit, connected to a connection element in series between the radiation portion and the parasitic portion, and the first isolation circuit being configured to block the radio-frequency signal and transmit the sensing signal;
   a second isolation circuit, electrically connected between the parasitic portion and a ground plane, and the second isolation circuit being configured to block the sensing signal and transmit the radio-frequency signal; and
   a high-frequency blocking element, electrically connected between the parasitic portion and a metal line, and transmitting the sensing signal from the antenna element to a sensing controller through the metal line.

2. The mobile communication device of claim 1, wherein the first isolation circuit comprises:
   a first inductive element, having a first terminal electrically connected to the parasitic portion and a second terminal electrically connected to the connection element; and
   a second inductive element, having a first terminal electrically connected to the connection element and a second terminal electrically connected to the radiation portion.

3. The mobile communication device of claim 1, wherein the first isolation circuit comprises an inductive element, and the inductive element and the connection element are connected in series between the radiation portion and the parasitic portion.

4. The mobile communication device of claim 1, wherein the second isolation circuit comprises:

a capacitive element, having a first terminal electrically connected to the parasitic portion; and an inductive element, having a first terminal electrically connected a second terminal of the capacitive element and a second terminal electrically connected to the ground plane.

5. The mobile communication device of claim 1, wherein the low-frequency blocking element is a capacitive element, a first terminal of the capacitive element is adjacent to the feeding point and electrically connected to the radiation portion, and a second terminal of the capacitive element is electrically connected to an inner conductor of a coaxial cable.

6. The mobile communication device of claim 1, wherein the high-frequency blocking element is an inductive element.

7. The mobile communication device of claim 1, wherein when the radio-frequency signal is received by the antenna element, the antenna element generates at least one high-frequency resonant mode through the radiation portion, and generates at least one low-frequency resonant mode through the radiation portion and the parasitic portion.

\* \* \* \* \*